United States Patent [19]

Fellows

[11] Patent Number: 5,423,727
[45] Date of Patent: Jun. 13, 1995

[54] TRANSMISSION OF THE TOROIDAL-RACE ROLLING-TRACTION TYPE

[75] Inventor: Thomas G. Fellows, Barnet, England

[73] Assignee: Torotrak (Development) Limited, England

[21] Appl. No.: 78,160

[22] PCT Filed: Dec. 18, 1991

[86] PCT No.: PCT/GB91/02261

§ 371 Date: Jul. 14, 1993

§ 102(e) Date: Jul. 14, 1993

[87] PCT Pub. No.: WO92/11475

PCT Pub. Date: Jul. 9, 1992

Related U.S. Application Data

[63] Continuation-in-part of Ser. No. 689,774, May 15, 1991, abandoned.

[30] Foreign Application Priority Data

Nov. 21, 1988 [GB] United Kingdom ............... 8827140
Jan. 30, 1989 [GB] United Kingdom ............... 8901982
Dec. 21, 1990 [GB] United Kingdom ............... 9027795

[51] Int. Cl.$^6$ ............................................. F16H 15/38
[52] U.S. Cl. ............................................. 476/40; 476/46
[58] Field of Search .................... 476/10, 39, 40, 42, 476/46, 48

[56] References Cited

U.S. PATENT DOCUMENTS

3,267,756  8/1966  Perry et al. .............. 476/46 X
3,933,054  1/1976  Iseman .................... 476/10

FOREIGN PATENT DOCUMENTS

0133330  2/1985  European Pat. Off. .
939602   2/1956  Germany .................. 476/46
1025735  3/1958  Germany .................. 476/10
261461   8/1949  Switzerland .............. 476/40
273495   5/1951  Switzerland .............. 476/40
418663  11/1934  United Kingdom .
482493   4/1938  United Kingdom .
979062   1/1965  United Kingdom .
1078791  8/1967  United Kingdom .
1600972 10/1981  United Kingdom .
9005860  5/1990  WIPO .

*Primary Examiner*—Dirk Wright
*Assistant Examiner*—Khoi Q. Ta
*Attorney, Agent, or Firm*—Davis, Bujold & Streck

[57] ABSTRACT

A roller control system for a CVT of the toroidal-race, rolling-traction type in which a roller assembly comprises a roller (1) mounted in a carriage, and in which operating mechanism (10) contacts and applies a predetermined control force to the carriage whereby to control the manner in which its roller transmits torque and ratio between the two dics with which it is in contact, and in which the roller assembly is located by only three contacts with adjacent components namely the two disc/roller contacts and the contact with the operating mechanism. The roller centre (6) can move along the roller axis (5) relative to the carriage, and the carriage and the operating mechanism are connected by way of a hinged joint (7) with a single degree of freedom. The preferred operating mechanism is of piston (11, 12) and cylinder (13, 14) type. The axis (8) of the hinge may lie between the operating mechanism and the roller, or (e.g. at 40, FIG. 4) may pass through the operating mechanism itself.

7 Claims, 2 Drawing Sheets

TRANSMISSION OF THE TOROIDAL-RACE ROLLING-TRACTION TYPE

This application is a continuation-in-part application of U.S. patent application No. 07/689,774 filed May 15, 1991 now abandoned.

This invention relates to continuously-variable-ratio transmissions (which will be referred to as CVT's) of the toroidal-race, rolling-traction type. It relates in particular to the variators, that is to say the ratio-varying units, of such transmissions in which rollers of variable orientation transmit traction between coaxial and part-toroidal input and output grooves or races, formed on coaxial and rotatable input and output discs respectively. By simultaneously altering the radius from the common axis of the discs at which the rollers make rolling contact with the two races, the relative speeds of the two discs change, so changing the transmitted ratio. While the prior art teaches and the invention will be described with relation to toruses of circular cross-section, the invention includes CVT's in which the torus is generated by rotating any closed figure, of generally circular outline, about a generator line.

It has been common practice in the art for a set of three rollers to transmit traction forces between each input race and its corresponding output race, to mount each roller so that it spins about an axle mounted in a supporting member usually called a carriage, and to interconnect the carriages of all the rollers in each set so that they all transmit the same force at all times.

Automobile applications for CVT's of the toroidal-race rolling-traction type have been the subject of patent applications since the beginning of this century, and especially from the 1920's onwards. Patent specification GB-A-1078791 shows an example of such a CVT in which each roller carriage is directly connected to a mechanical linkage of levers and other solid actuating components, while specification EP-B-0 133330 shows an example of many more recent proposals in which the roller carriages directly contact hydraulic pistons. In both specifications, each roller is mounted in an elongated carriage which is in turn positively held at both ends by its actuating mechanism. Such a double-ended hold upon each carriage naturally requires many mechanical parts and joints and adds to the size, complexity and cost of the CVT.

Patent publication WO 90/05860 describes a more recent invention which arose from appreciating that the carriages and rollers of this type of CVT can be effectively held and controlled in a manner which involves far less components and mechanical joints, and which therefore offers the prospect of greater simplicity and cheapness. Essentially each carriage and roller is controlled by a hydraulic operating mechanism positvely connected to one end of the carriage only, and each roller assembly is located at all times by only three contacts with adjacent components, namely the two disc-roller contacts and the contact with the operating mechanism.

According to the teaching of the invention of publication WO 90/05860, if it is necessary to exert any force upon the other end of the carriage—for instance because the operating mechanism is only single-acting in operation—that force should be applied in a manner which imposes no positional constraint upon the part of the carriage to which it is applied. The invention described in publication WO 90/05860 is thus to be distinguished from the kinds of prior proposals described, for example, in GB-A-979062, U.S. Pat. No.3,933,054 and GB-A-1600972, in each of which each assembly of roller and carriage requires to be positively located, in operation, not by three but by four points of contact with adjacent mechanism.

One feature of the invention described in publication WO/90/05860 is that each roller is mounted, within its carriage, in such a way that both the axis and the centre of the roller are fixed relative to that carriage. The present invention arises from appreciating that if for some reason there are advantages in mounting the rollers relative to their carriages in a manner which fixes the roller axis but allows the roller centre some freedom of movement along that axis, it is still possible to achieve a mounting and control of each roller carriage that is comparable in simplicity and cheapness to the mountings described in WO 90/05860. The invention is defined by the claims, the contents of which are to be read as included within the body of this specification, and includes a roller control system as described with reference to the accompanying simplified drawings. Embodiments of the invention will now be described by way of example with reference to those drawings in which:

Figure 1:
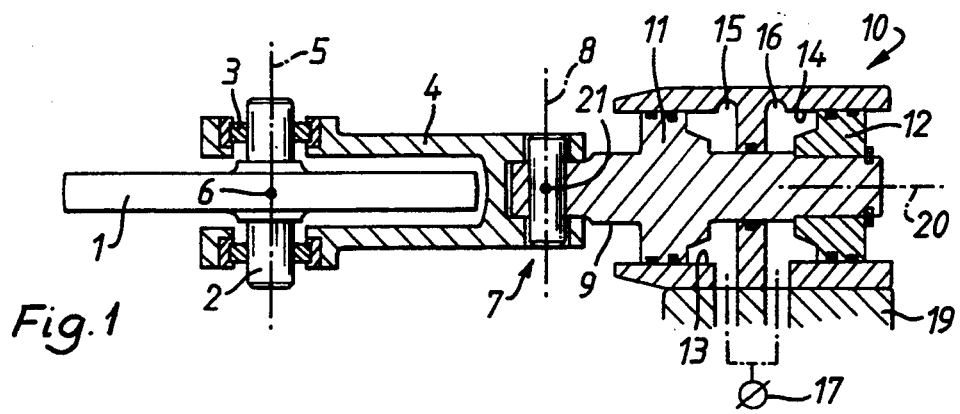
FIG. 1 shows one roller assembly and operating mechanism in section.
Figure 5:
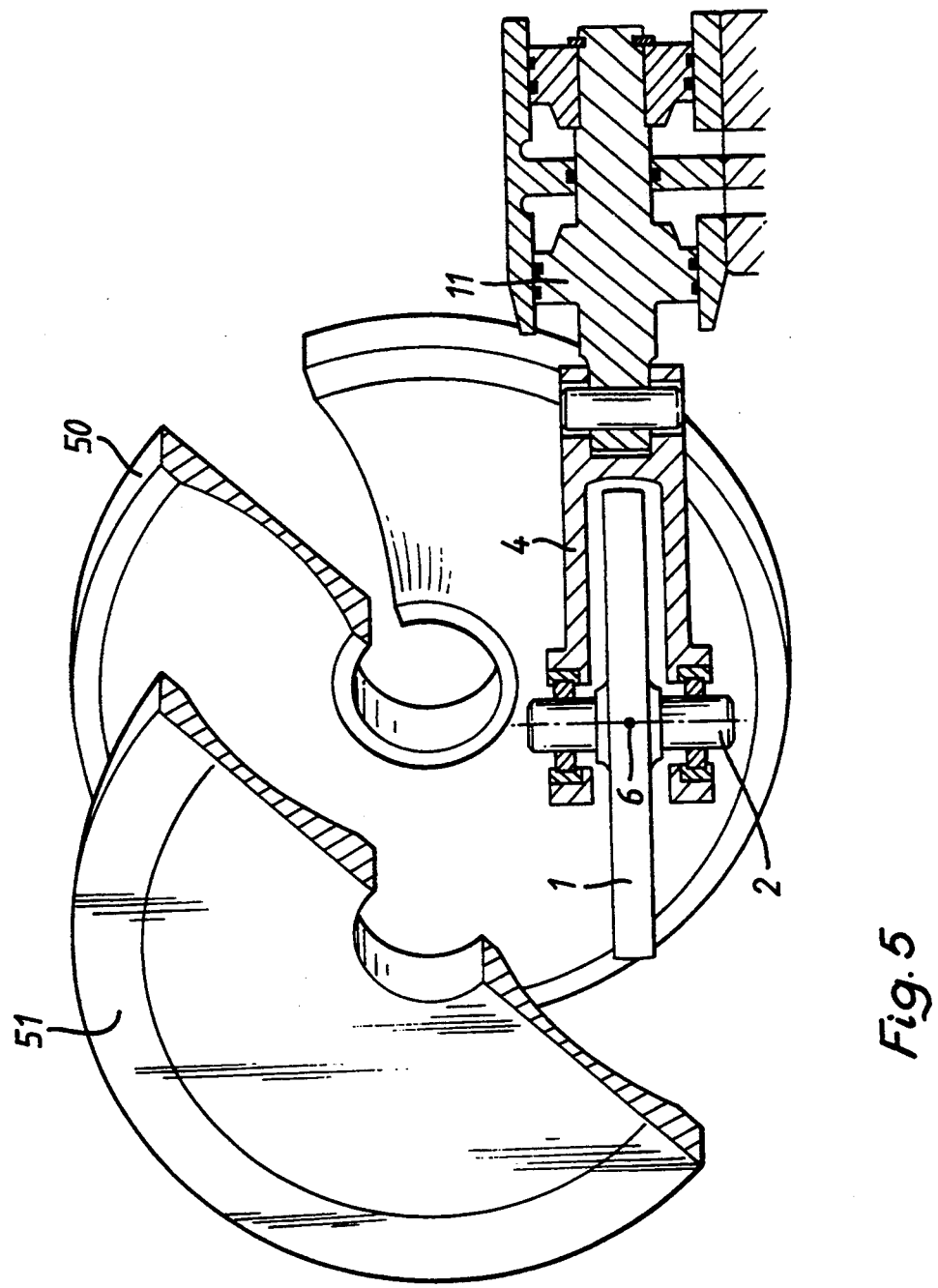
FIG. 5 shows a roller assembly as shown in FIG. 1 located between two coaxial rotatable toroidal races (discs) of a CVT, both discs are partially broken away to illustrate their toroidal shape.

In FIG. 1 a roller 1, carrying an axle 2, is mounted in roller bearings 3 supported by a carriage 4. Because they are of roller form, the bearings 3 hold the roller axis 5 fixed relative to carriage 4, but allow the roller centre 6 limited freedom of movement along that axis. Carriage 4 is connected by a hinged or other pivotal joint 7, permitting rotation about a single axis 8 only, to a rod 9 forming part of an operating mechanism indicated generally at 10. Rod 9 carries pistons 11 and 12 which operate within aligned cylinders 13 and 14, connected by ports 15 and 16 to a controlled pressure fluid source 17. The structure of cylinders 13 and 14 is anchored to a fixed part 19 of the CVT. In operation, in a manner analogous to that described in publication WO 90/05860, the roller will be positively located by only three points of contact with adjacent mechanism, namely its contacts with the input and output discs 50, 51 (FIG. 5) between which it is transmitting traction, and its point of contact with its operating mechanism 10, which may be regarded as the centre 21 of the hinge joint 7. As in the CVT's described in publication WO 90/05860, the ratio transmitted by roller 1 between its associated input and output discs is determined by the position of pistons 11, 12 relative to their operating axis 20, and that position in turn reflects the balance between the force (along axis 20) of the disc/roller reactions, and the net hydraulic force acting upon pistons 11, 12 by reason of the net hydraulic pressure set up in cylinders 13, 14 by the source 17 and its associated control. The necessary degrees of freedom of movement, to allow roller centre 6 to follow its appropriate locus between the input and output discs as the ratio changes, is provided by:

1. the freedom of centre 6 to move along axis 5 relative to carriage 4;
2. the freedom of carriage 4 to hinge, about axis 8 only, relative to the operating mechanism, and
3. the ability of pistons 11 and 12 both to move along the fixed axis 20, and to rotate about it.

Figure 2:
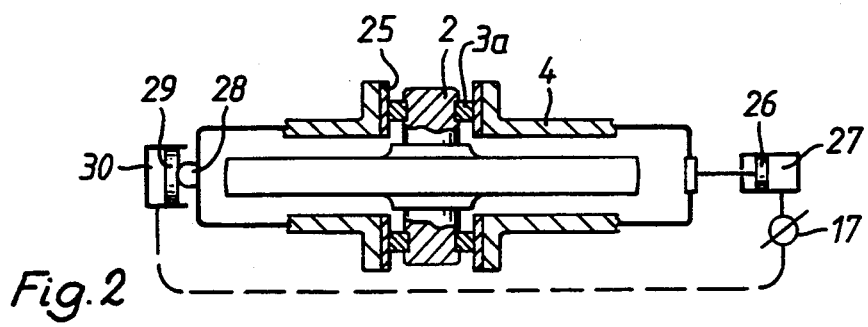
FIG. 2 shows another roller assembly, with certain features shown schematically only.

FIG. 2 shows a minor modification of the axle mounting of FIG. 1, in which instead of that axle 2 being free to slide within the roller bearings 3, the bearing members (3a) are fixed to the axle but themselves have limited freedom of axial sliding within their outer sleeves 25. FIG. 2 also shows, schematically and more importantly, how the mechanism of FIG. 1 could be modified if the double-acting piston-and-cylinder combination (11-14) of that Figure were replaced by a single-acting piston and cylinder 26, 27. In the same manner as is shown in certain figures of publication WO 90/05860, an abutment 28 on the opposite end of carriage 4 now contacts a piston 29, operating within a hydraulic cylinder 30 which may also be controlled from source 17. The locus of contact between items 28, 29 is variable, so that this contact does not add to or subtract from the degrees of freedom and restraint already described, and the sole effect of piston 29 upon the roller assembly is to exert a return force which items 26, 27 would themselves exert if they were double-acting, as with items 11-14 in FIG. 1.

Figure 3:
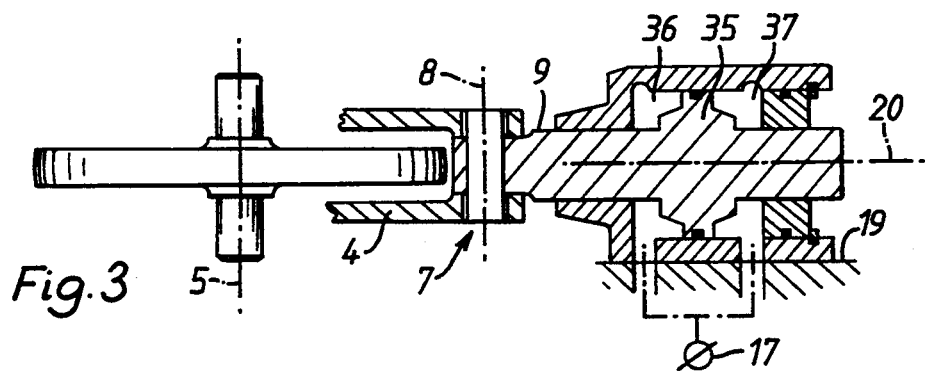
FIG. 3 shows another roller assembly and operating mechanism in section.

In FIG. 3 a single piston 35, movable along fixed axis 20 as before but now working between opposed hydraulic chambers 36 and 37, is substituted for the two pistons 11, 12 of FIG. 1. Chambers 36, 37 are connected to controlled fluid source 17, as were the chambers of cylinders 13, 14 in FIG. 1. Carriage 4 is again connected to the piston rod 9 by a hinge joint 7 allowing rotation about a single axis 8 only.

Figure 4:
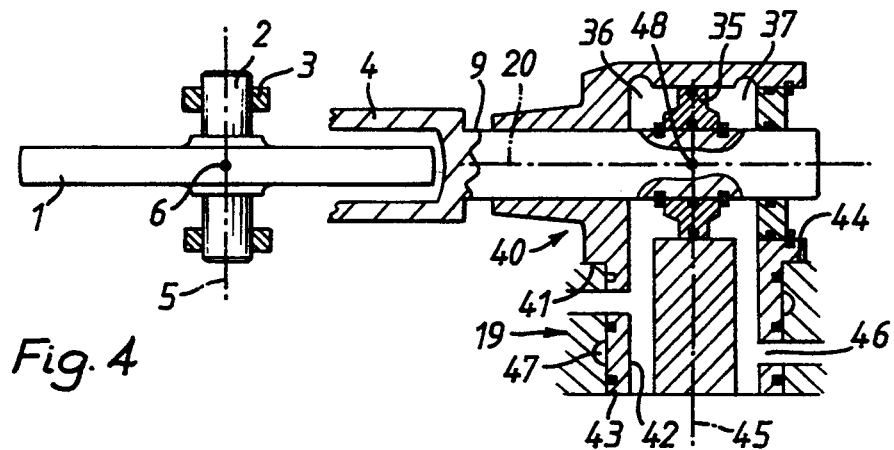
FIG. 4 is a similar view of yet another assembly and mechanism.

In FIG. 4 the hinged joint 7 of previous figures is omitted, and carriage 4 is directly attached to the rod 9 of a piston 35, working within cylinders 36 and 37 as in FIG. 3. Now however the entire cylinder assembly 40, instead of being anchored to a fixed part (19) of the CVT as in FIGS. 1 and 3, is formed with a flange 41 and spigot end 42 carrying ring seals 43. A shoulder 44 on the fixed part 19 abuts flange 41, and spigot 42 fits within a recess in part 19 so that structure 40 can rotate as a whole relative to the fixed part about axis 45, in the manner of a gun turret. Chambers 36 and 37 are now connected to source 17 by way of cooperating ports 46 in spigot 42 and ring conduits 47 in part 19. The necessary degrees of freedom to enable roller centre 6 to follow its appropriate locus, as the CVT changes ratio, are now given by:

1. the freedom of centre 6 to move axially within roller bearings 3, as in FIG. 1;
2. the freedom of piston 35 to move lengthwise relative to axis 20 and also to rotate about it, also as in FIG. 1, and
3. the freedom of structure 40 to rotate, relative to fixed CVT part 19, about the single axis 45, and the point of contact of the rigid structure of carriage 4 with the operating mechanism may now be regarded as the point 48 of intersection between axes 20 and 45.

The following are among the prospective advantages of roller control systems according to the present invention. Firstly a hinge—e.g. items 7 in FIGS. 1 to 3, and the hinge about axis 45 in FIG. 4—can be cheaper and can package better than joints allowing relative rotation about more than one axis, as shown in some of the embodiments in publication WO 90/05860, for example. Secondly the hinge or swivel joints (about axes 8, 45), just described, ensure that the associated pistons (11, 12, 35) of the operating mechanisms will rotate in their cylinders whenever the roller centre is displaced along axis 20, and the CVT therefore changes ratio. This may be important because that rotation, when taking place under any powerful forces exerted from the roller, will tend to break any "stiction" between the pistons and their respective cylinders and thus promote smooth operation and true equalisation of force between all the rollers, each supplied in parallel from source 17, that are transmitting traction between any one input disc and its corresponding output disc. Thirdly conventional seals for the control pistons (11, 12, 35) can be used, because these pistons are subject neither to tilting nor to large displacements. Fourthly no unwanted steering angles are imposed on a roller as the result of any slight and unprogrammed radial displacement of its centre, or indeed from the unavoidable radial displacement that the centre of each roller undergoes, upon ratio change, If races of non-uniform torus radius (as shown for instance in specification GB-A-673178) are used.

I claim:

1. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experienced by the roller assembly in a plane at right angles to the axis of the discs is zero, in which the roller assembly is located by only three contacts with adjacent components, namely the two disc/roller contacts and the contact with the operating mechanism, wherein the roller centre (6) is moveable along the roller axis (5), relative to the carriage; and the carriage and the operating mechanism are connected by way of a hinged joint (7) with a single degree of freedom.

2. A roller control system according to claim 1 characterised in that the operating mechanism includes a piston (35, FIG. 3) movable within a cylinder (36, 37).

3. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experienced by the roller assembly in a plane at right angles to the axis of the discs is zero, in which the roller assembly is located by only three contacts with adjacent components, namely the two disc/roller contacts and the contact with the operating mechanism, wherein the roller centre (6) is moveable along the roller axis (5), relative to the carriage;

the carriage and the operating mechanism are connected by way of a hinged joint (7) with a single degree of freedom, and the operating mechanism includes a piston (35, FIG. 3) movable within a cylinder (36, 37), wherein the piston and cylinder combination is double-acting.

4. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experienced by the roller assembly in a plane at right angles to the axis of the discs is zero, wherein the roller centre (6) is moveable along the roller axis (5), relative to the carriage;

the carriage and the operating mechanism are connected by way of a hinged joint (7) with a single degree of freedom, the operating mechanism includes a piston (35, FIG. 3) movable within a cylinder (36, 37), and the piston and cylinder combination (26, 27 FIG. 2) is single-acting and capable of exerting a force in a first direction, and a separate mechanism (28–30) is provided and capable of exerting a force upon the carriage in a second substantially opposite direction, such that the equilibrium position is determined by only three contacts with adjacent components, namely the two disc/roller contacts and the contact with the operating mechanism.

5. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experienced by the roller assembly in a plane at right angles to the axis of the discs is zero, in which the roller assembly is located by only three contacts with adjacent components, namely the two disc/roller contacts and the contact with the operating mechanism, characterized in that the roller centre (6) is moveable along the roller axis (5), relative to the carriage;

the carriage and the operating mechanism are connected by way of a hinged joint (7) with a single degree of freedom; and the axis (8) of the hinged joint is substantially parallel to the spin axis (5) of the roller.

6. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experienced by the roller assembly in a plane at right angles to the axis of the discs is zero, in which the roller assembly is located by only three contacts with adjacent components, namely the two disc/roller contacts and the contact with the operating mechanism, characterized in that the roller centre (6) is moveable along the roller axis (5), relative to the carriage;

the carriage and the operating mechanism are connected by way of a hinged joint (7) with a single degree of freedom, and the operating mechanism includes a piston (35, FIG. 3) movable within a fixed cylinder (36, 37), and the axis of the hinged joint is located between the piston and the roller.

7. A roller control system for a CVT of the toroidal-race, rolling-traction type in which a roller assembly comprises a rigid carriage (4) and bearings (3) mounted thereon and a roller (1) mounted to spin in those bearings about a roller axis (5) passing through a centre (6) of the roller (1), in which the roller contacts, and transmits traction between, coaxial rotatable discs presenting input and output races of toroidal form and in so doing is subjected to traction forces at the disc/roller contacts, in which an operating mechanism (10) includes fixed (13, 14, 19) and movable (11, 12) parts and is in contact with and operable to apply a predetermined control force to the carriage, in which the operating mechanism and carriage seek an equilibrium position in which the resultant of the control force and of the traction forces experiences by the roller assembly in a plane at right angles to the axis of the discs is zero, in which the roller assembly is located by only three contacts with adjacent components, namely the two disc/roller contacts and the contact with the operating mechanism, characterized in that the roller centre (6) is moveable along the roller axis (5), relative to the carriage;

the carriage and the operating mechanism are connected by way of a hinged joint (7) with a single degree of freedom, and the operating mechanism includes a piston (35, FIG. 4) movable within a movable cylinder (40, FIG. 4) and the hinged joint occurs between the cylinder structure (42) and the fixed part (19) of the operating mechanism.

* * * * *